United States Patent [19]
Walchle et al.

[11] 3,750,698
[45] Aug. 7, 1973

[54] COATED VALVING MEMBER

[75] Inventors: David L. Walchle; Peter J. Schmidt, both of Cincinnati, Ohio

[73] Assignee: Xerox Corporation, Cincinnati, Ohio

[22] Filed: Mar. 23, 1972

[21] Appl. No.: 237,583

Related U.S. Application Data

[62] Division of Ser. No. 55,370, July 16, 1970, Pat. No. 3,670,071.

[52] U.S. Cl. ............................... 137/375, 251/305
[51] Int. Cl. .............................................. F16k 1/22
[58] Field of Search ...................... 137/375; 251/286, 251/305, 306

[56] References Cited
UNITED STATES PATENTS

| | | | |
|---|---|---|---|
| 2,059,687 | 11/1936 | Gagg | 251/286 |
| 3,336,938 | 8/1967 | Schenck | 137/375 |
| 3,394,914 | 7/1968 | Nagasato | 137/375 X |
| 3,425,439 | 2/1969 | Duffey et al. | 137/375 |
| 3,450,151 | 6/1969 | Heutzenroeder | 137/375 |

*Primary Examiner*—Henry T. Klinksiek
*Attorney*—J. Warren Kinney, Jr.

[57] ABSTRACT

All areas of the butterfly type valving member which may be exposed to attach by corrosive substances, are coated with a protective material of the class of tetrafluoroethylene or equivalent substance, by a high-pressure and high-temperature molding process; the process involving withdrawing support from a journal end of the valving member during a critical phase of the molding procedure to ensure adequate coating of said journal end including the customary turning center hole thereof.

5 Claims, 10 Drawing Figures

PATENTED AUG 7 1973 3,750,698

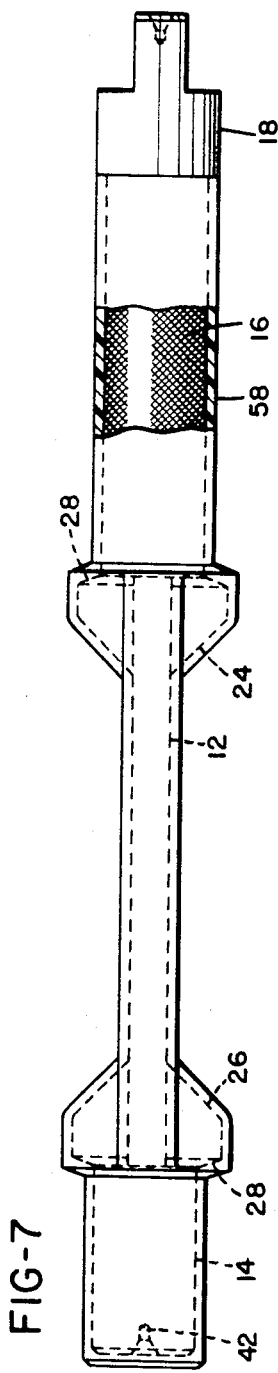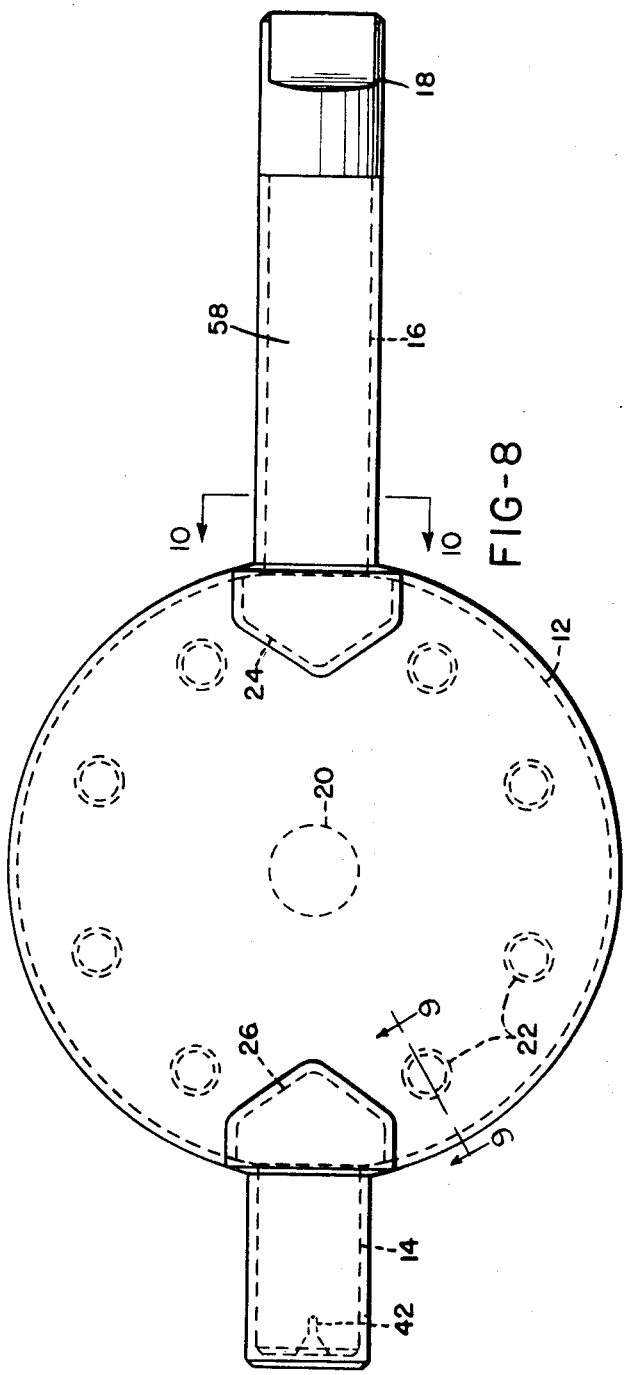

COATED VALVING MEMBER

This is a division of application, Ser. No. 055,370, filed July 16, 1970, now U.S. Pat. No. 3,670,071.

This invention relates to a coated valving member and method of manufacturing the same.

The valving member here concerned involves a butterfly valve or paddle valve, which usually comprises a substantially flat circular body plate or disc of metal or other rigid material, having located at opposite ends of a diameter or chord a pair of axially aligned cylindrical shaft sections. The shaft sections may be welded, brazed, or otherwise fixedly secured to the body plate, with the shaft section axes disposed in substantially the mean plane of the body plate. The assembly may be constructed of a corrosion-resistant material, preferably a metal of the class of stainless steel, brass or bronze. If desired, the assembly may be cast or molded as one piece.

In accordance with the present invention, the valving member is to be coated with a tough corrosion-resistant and wear-resistant material having a low coefficient of friction and inherent self-lubricating, impervious properties. The coating material may be a moldable plastic of the class of Teflon TFE (tetrafluoroethylene), or other high density polyethylene, products as Teflon FEP, Kynar, Kel-F, Penton and the like.

The coating process involves high-pressure, high-temperature application of the coating to the body plate and to both shaft sections, with particular attention given to fully enveloping at least one of the shaft sections. The coating is applied by injection molding procedure, and involves supporting the bare valving member in a mold in such manner as will permit a flow of coating material uniformly onto all surfaces of the body plate and its shaft sections, including the terminal end of one of said sections. For this purpose a novel procedure and technique are resorted to as one object of the present invention.

The coated valving member afer removal from the mold, may be mounted in a butterfly valve body which also may be plastic coated and lined, the valve body having aligned bearings to receive and rotatably support the shaft sections of the valving member. One shaft section of the valving member may be disposed for manipulation, manually or mechanically, for selective disposition of the valving member to open or closed positions within the valve body.

An object of the present invention is to provide an improved coated valving member for butterfly valves, and a highly effective and desirable method of producing such a valving member.

Another object of the invention is to minimize the cost of producing a plastic coated valving member by eliminating most or all machining of the valving member components.

Another object is to provide an improved coating process for valving members which is highly efficient, and productive of a minimum number of rejects in the manufacture, the coating being fully protective of all areas of the valving member which might be exposed to corrosive chemicals or gases in service.

A further object of the invention is to provide a novel method and means of coating, whereby a shaft terminal end of the valving member may be effectively and completely coated during the coating operation, with the assurance of maintaining uniformity of coating thickness in other areas of the valving member.

Another object is to provide a valving member of the character stated, which upon incorporation in a lined valve body, ensures easy manipulation of the valve and minimizes the likelihood of leakage of any fluid from the interior of the valve while in service.

The foregoing and other objects are attained by the means described herein and illustrated upon the accompanying drawings, in which:

FIG. 7 is an edge view of the completed valving member.

FIG. 8 is a face view of the same.

Figure 1:
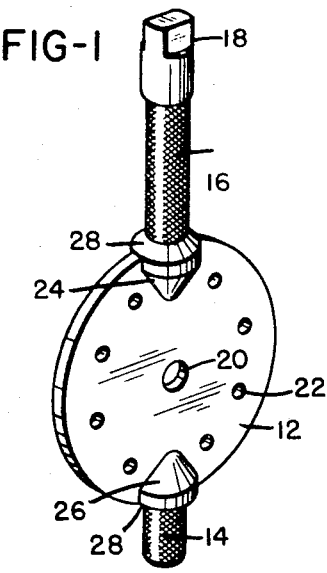
FIG. 1 is a perspective view of a butterfly type valving member such as the present invention is concerned with, said valving member being uncoated.
Figure 2:
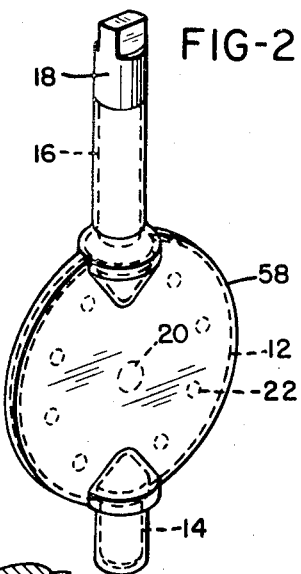
FIG. 2 is a view of the valving member with the plastic coating applied thereto.

The valving member as herein disclosed may comprise a substantialy flat circular body plate or disc 12 of metal or other rigid material, having located at opposite ends of a diameter or chord the axially aligned cylindrical shaft sections 14 and 16. The shaft section 14 mey be considered a stud shaft or journal adapted to rotate in a bearing located within a valve body. Shaft section 16 likewise is to be supported in a bearing of the valve body, and may be considered the actuating stem of the valving member.

Shaft sections 14 and 16 may be welded, brazed or otherwise fixedly secured to body plate 12 or if desired, they may be formed integrally therewith as by casting, molding, forging or other process. The assembly may be constructed of a corrosion-resistant material, preferably a metal such as stainless steel, brass, bronze or the like. The axes of shaft sections 14 and 16 are disposed in alignment, and may rest in the mean plane of plate 12. The journal stud 14 and a portion of stem 16 may be knurled or otherwise roughened as shown, for effecting a bond with a coating material to be applied thereto.

With further reference to FIG. 1, the outer end of stem or shank 16 may carry a suitable head or the like 18 to receive a wrench, handle or other actuating means whereby the valving member may be rotated axially of members 14 and 16, either manually or by power device. Body plate 12 may be provided with a center hole or through aperture 20, and with a circular row of perforations 22 spaced from the rim or perimeter of the plate. In the finished product, the perforations 20 and 22 will be filled with the plastic material which coats the valving member.

Conical hubs 24 and 26 may form the connections between the shaft sections and plate 12, and each hub may include a conical annular bearing surface denoted 28, 28 arranged concentrically with the shaft section axes. The bearing surfaces 28, 28 are adapted to seal against suitable bearing surfaces of a valve body (not shown) to oppose leakage of fluid along shafts 14 and 16; however, details of this are believed unnecessary for a full understanding of the present invention. All sharp edges are to be removed from the perimeter of body plate 12, and such edges may be rounded off, by preference.

In accordance with the present invention, the valving member is to be coated with a tough corrosion-resistant material having a low coefficient of friction and the qualities of imperviousness, durability and inherent self-lubrication. The coating material may be a moldable plastic of the class of Teflon TFE (tetrafluoroethylene), or other high density polyethylene, polycarbonate, or polypropylene, and including such products as Teflon FEP, Kynar, Kel-F, Penton and the like.

To apply the coating to the valving member, a bi-part metallic mold is provided (FIGS. 3 through 6), having a first part 30 and a second part 32 provided with substantially identical cavities 34 and 36, the cavities each being shaped to the outline of the valving member, with clearance all around to accommodate the plastic material injected for enveloping the valving member. The outline of such mold cavity corresponds substantially to the shape which results from a plane bisecting the thickness of body plate 12 and shaft sections 14, 16, plus the necessary clearance mentioned.

Figure 3:
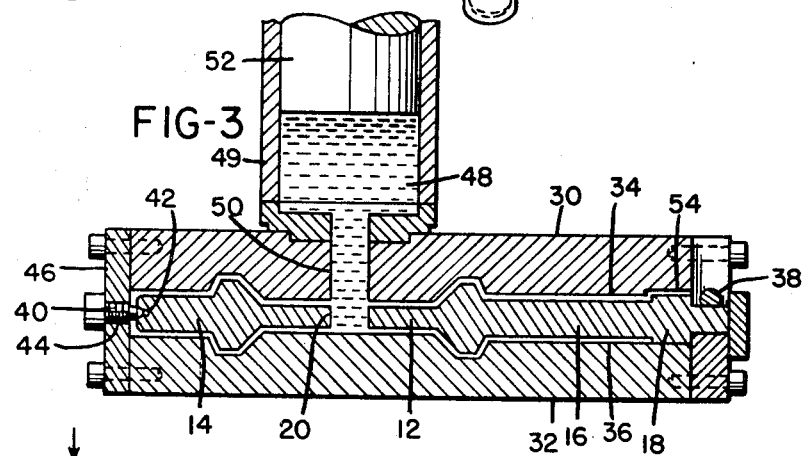
FIG. 3 is a cross-section of a mold in which is supported the valving member of FIG. 1 preparatory to injection of fluidic plastic into the mold and about the valving member.
Figure 4:
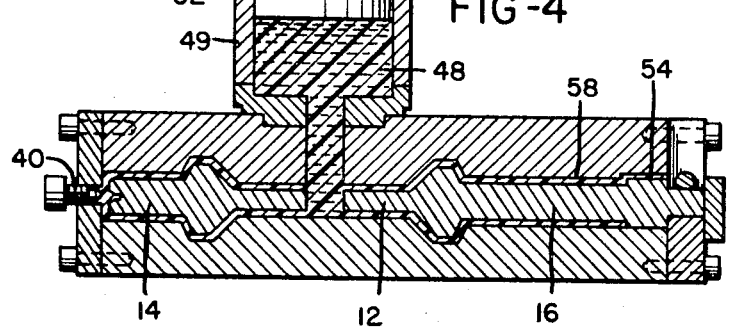
FIG. 4 is a view similar to FIG. 3, showing the mold charged with plastic coating material just prior to solidification of the material.
Figure 5:
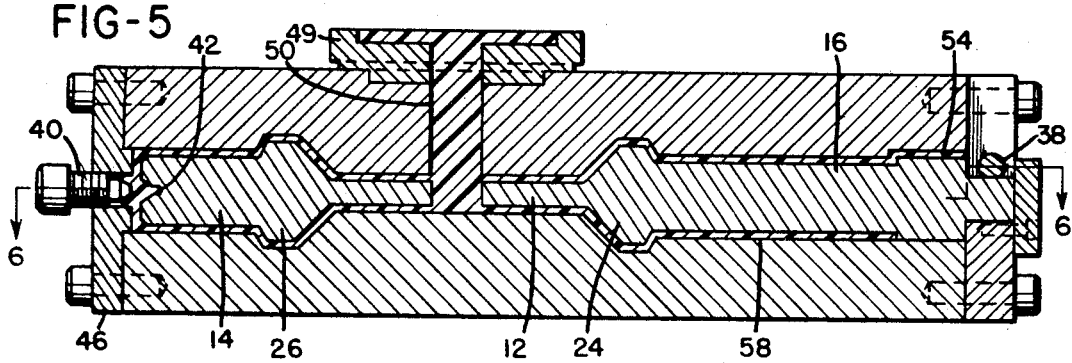
FIG. 5 is a view similar to FIG. 4, showing a phase of the molding process wherein a mandrel supportive of the valving member within the mold has been retracted, to permit flow of coating material into an end cavity of the valving member shaft, while partially solidified coating material supports the valving member within the mold.

The mold carries a suitable clamp device 38 which grips the shaft head 18 to center the shaft section 16 within the mold cavity while the mold is closed on the valving member, FIG. 3. A mandrel, which may be in the form of a pointed screw 40, may be advanced into the turning center hole 42 in the stud shaft section 14, to center said shaft section 14 within the mold cavity according to FIG. 3. The mandrel 40 may have a screw-threaded connection at 44 with a normally fixed bridge plate 46 that spans the mold parts, said connection at 44 making possible an axial shifting of the mandred inner end relative to shaft section 14.

Coating plastic indicated at 48, may be introduced as a heated and pressured fluid into the cavity of mold 30, 32, through a cylinder 49 and sprue 50 by means of a plunger 52. The force of the plunger drives the fluid plastic through plate aperture 20, and laterally in all directions over and under the valving member, until all parts of the valving member which are exposed within the mold cavity are coated with plastic material.

Before the plastic material sets completely, but while it is sufficiently stable to support the valving member against sagging within the mold cavity, an attendant will manipulate the mandrel 40 to retract its inner end from the turning center hole 42, thereby permitting entry of fluid plastic material into said hole. In this way, the terminal end of shaft section 14 is assured a complete cover of coating material, as is plainly indicated upon FIGS. 4, 5 and 6. The drawing views indicate also a complete uninterrupted coating for shaft section 16, body plate 12, and the hubs 24 and 26. It is noted also that the plastic material fills all the plate apertures 20 and 22, FIGS. 2, 6, 8 and 9.

The plastic material may be introduced under high pressure into the heated mold at a temperature approximating 700° F, and until the mold cavity is filled and plastic material begins to exude through a small vent located at 54. As cooling gradually occurs, the plastic material at about 575° F, though still fluid to some extent, acquires a set sufficient to support the flat body plate 12 and stud 14 without the aid of mandrel 40; and at this stage of the process an attendant will retract the mandrel to permit flow of plastic material into the turning center hole 42 of the stud shaft. After cooling of the assembly to about 300° F, the mold may be parted to release the coated valving member illustrated by FIGS. 2, 7 and 8.

At the time of retracting the mandrel 40, the body plate 12 should be disposed with its plane horizontal so as to offer maximal surface area to the partially set coating material underlying and supporting said plate. This avoids any tendency of the body plate to cleave or shear the partially set material. Alternatively, the mold might be disposed with the rotating axis of the valving member upright, to the same advantage.

Figure 6:
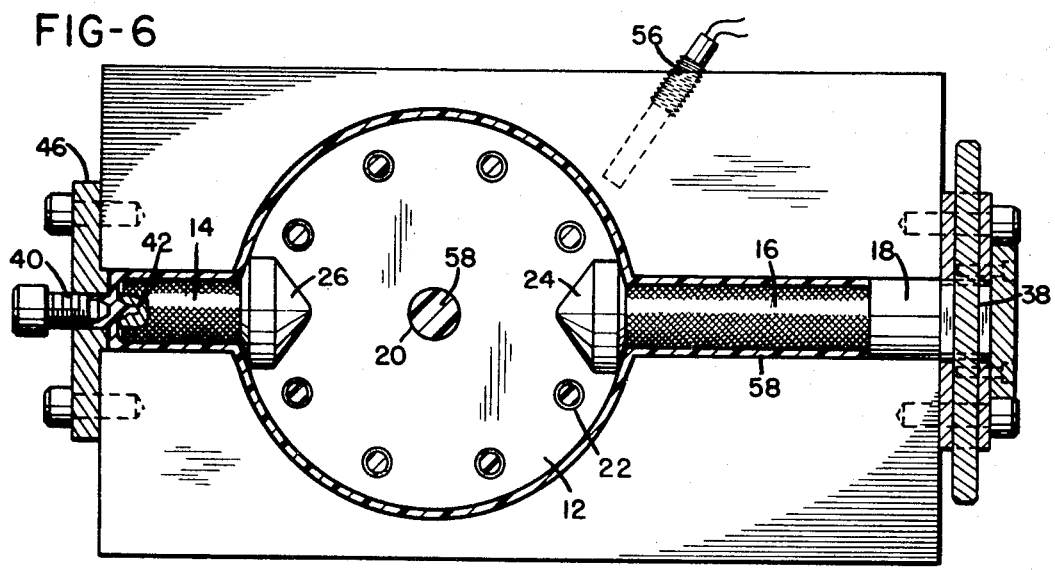
FIG. 6 is a cross-sectional view taken on line 6—6 of FIG. 5.
Figure 9:
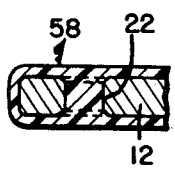
FIG. 9 is a fragmental cross-section taken on line 9—9 of FIG. 8.
Figure 10:
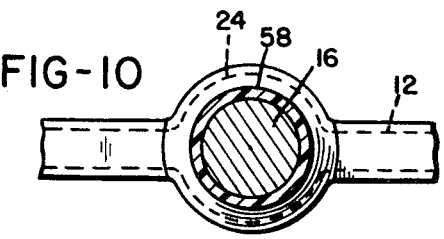
FIG. 10 is a fragmental cross-section taken on line 10—10 of FIG. 8.

The reference numeral 56, FIG. 6, indicates a thermocouple or similar temperature responsive device used in measuring the mold temperature at all stages of the molding or coating procedure.

By preference, though not of necessity, the shaft sections 14 and 16 are knurled or otherwise roughened as in FIGS. 1, 6 and 7, to enhance adherence of the coating material and preclude any tendency thereof to slip either lengthwise or rotationally of the shaft sections. Also, the head end 18 of shaft section 16 may remain uncoated, if desired. With the possible exception of head 18, all metallic surfaces of the valving member are protected fully by the coating of molded plastic material. The coating of molded plastic material is identified by the reference numeral 58. As was previously pointed out, the coating material utilized has a high degree of durability and will effectively protect the valving member and its journals against the destructive action of corrosive liquids and gases when incorporated in a valve body.

What is claimdd is:

1. A butterfly-type valving member comprising a substantially flat, circular, substantially rigid, metal body plate, a pair of axially aligned cylindrical shaft sections integral with the body plate and located at opposite ends of a diameter or chord thereof, one of which sections is a stud shaft having a terminal end, and the other of which constitutes an actuating stem having an outer end for engagement with an actuator to actuate the valve, a plurality of spaced apart openings through said plate, and a protective coating material molded on said plate, said stud shaft, and said stem, and conforming to all surfaces of said plate and said stud shaft and all surfaces of said stem except said outer end, said coating filling and extending through said openings to integrally attach the coating on opposite sides of the plate, said coating material being characterized by wear-resistance, corrosion-resistant and inherently self-lubricating properties 2. The valving member as defined by claim 1, wherein said coating material is a material of the class of tetrafluoroethylene or the like.

3. The valving member as defined by claim 1, wherein said stud shaft and said stem are roughened to enhance adherence of said coating material and to oppose displacement of said material thereon.

4. The valving member as defined by claim 1, wherein said openings through said body plate comprise a central aperture, and a plurality of circumferentially spaced apertures adjacent to the periphery of said plate, all of said apertures being filled with the coating material.

5. A butterfly-type valve as in claim 1, wherein said stem includes a reduced diameter portion between the body plate and the outer end of the stem defining a recessed area on the stem, said coating material filling said recess to define a substantially flush outer surface on said stem, said coating being injection molded on said valve.

* * * * *

UNITED STATES PATENT OFFICE
CERTIFICATE OF CORRECTION

Patent No. 3,750,698  Dated August 7, 1973

Inventor(s) DAVID L. WALCHLE, ET. AL.

It is certified that error appears in the above-identified patent and that said Letters Patent are hereby corrected as shown below:

On the cover sheet [73], "Xerox Corporation, Cincinnati, Ohio" should read -- Xomox Corporation, Cincinnati, Ohio, a corporation of Ohio -- .

Signed and sealed this 25th day of December 1973.

(SEAL)
Attest:

EDWARD M. FLETCHER, JR.
Attesting Officer

RENE D. TEGTMEYER
Acting Commissioner of Patents